United States Patent [19]

Hori

[11] Patent Number: 4,491,482

[45] Date of Patent: Jan. 1, 1985

[54] POWDERY MATERIAL OF MINUTE COMPOSITE CERAMIC PARTICLES HAVING A DUAL STRUCTURE AND A PROCESS AND AN APPARATUS PRODUCING THEREOF

[75] Inventor: Saburo Hori, Matsudo, Japan

[73] Assignee: Kureha Kagaku Kogyo Kabushiki Kaisha, Tokyo, Japan

[21] Appl. No.: 477,765

[22] Filed: Mar. 22, 1983

[30] Foreign Application Priority Data

Mar. 29, 1982 [JP] Japan .................. 57-50541

[51] Int. Cl.$^3$ .................. C09C 1/00; C09C 1/40
[52] U.S. Cl. .................. 106/308 B; 106/299; 264/60; 423/608; 428/404; 501/105; 501/127
[58] Field of Search .................. 428/404; 501/105; 106/299, 308 B; 423/608; 264/60

[56] References Cited

U.S. PATENT DOCUMENTS

| | | | |
|---|---|---|---|
| 3,663,283 | 5/1972 | Hebert et al. | 106/299 |
| 3,730,748 | 5/1973 | Lailch et al. | 106/299 |
| 3,809,543 | 5/1974 | Gaskell et al. | 501/4 |
| 3,811,907 | 5/1974 | Scammon et al. | 106/308 B |
| 4,110,492 | 8/1978 | Hayman | 106/308 B |
| 4,298,385 | 11/1981 | Claussen et al. | 501/105 |
| 4,316,964 | 2/1982 | Lange | 501/105 |
| 4,322,249 | 3/1982 | Claussen et al. | 501/105 |
| 4,419,311 | 12/1983 | Claussen et al. | 501/105 |
| 4,429,051 | 1/1984 | Davidge et al. | 501/105 |

FOREIGN PATENT DOCUMENTS 265179 6/1963 Australia .................. 423/608

Primary Examiner—Helen M. McCarthy
Attorney, Agent, or Firm—Lyon & Lyon

[57] ABSTRACT

A powdery material of minute composite ceramic particles having a dual structure, comprising the core formed of zirconium oxide and the outer shell formed of aluminum oxide, a process for producing thereof, which comprises introducing gaseous zirconium chloride into a combustion chamber provided with a constricting section at the center part thereof and a burner at the upper part thereof, introducing gaseous aluminum chloride into the combustion chamber at the constricting section or the lower part thereof, and thermally decomposing both the thus introduced zirconium chloride and aluminum chloride by a flame from said burner under an oxidative atmosphere, and an apparatus for producing thereof.

2 Claims, 4 Drawing Figures

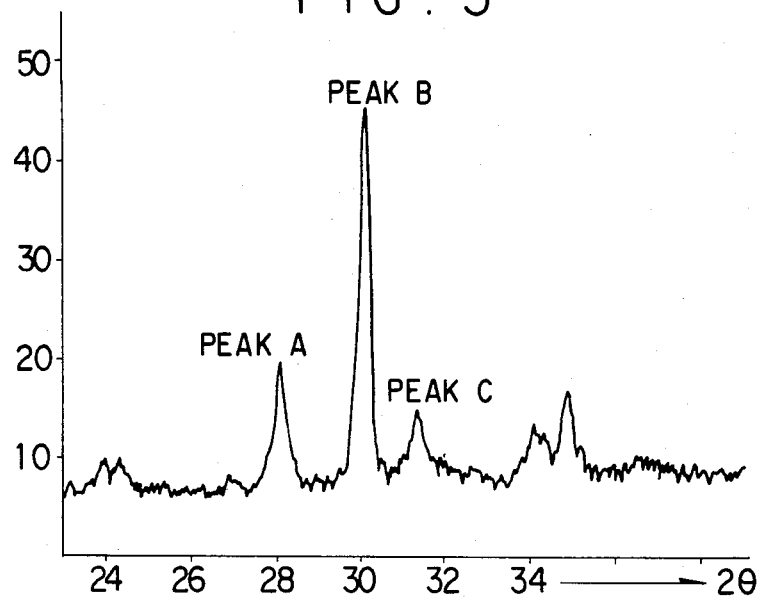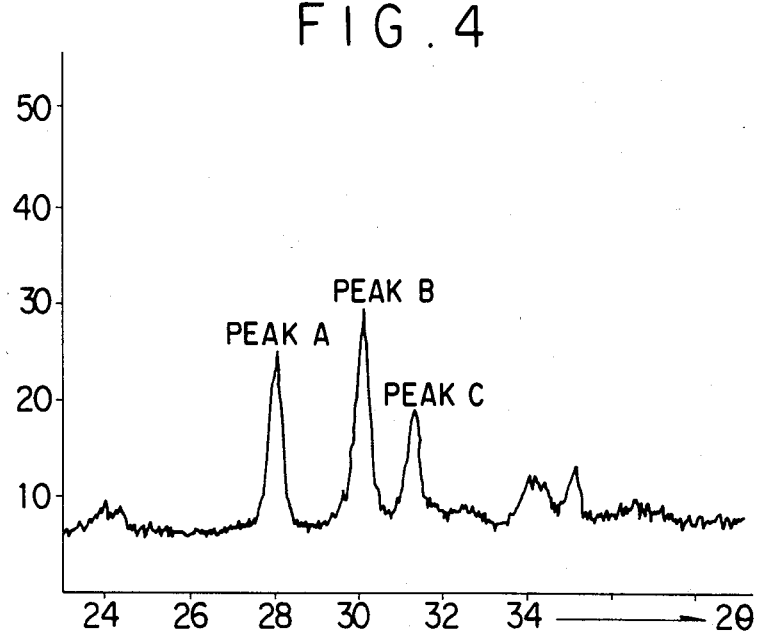

POWDERY MATERIAL OF MINUTE COMPOSITE CERAMIC PARTICLES HAVING A DUAL STRUCTURE AND A PROCESS AND AN APPARATUS PRODUCING THEREOF

BACKGROUND OF THE INVENTION

The present invention relates to a powdery material of minute composite ceramic particles having a dual structure, comprising the core formed of zirconium oxide and the outer shell formed of aluminum oxide, a process for producing thereof and an apparatus for producing thereof.

Generally, processes for producing a powdery material of minute ceramic particles in gas phase have been known (refer to "Bulletin of the Ceramic Society of Japan", Vol. 13, No. 8, pages 625–633, 1978). For instance, while using a vapour of an easily vaporizable compound such as metal halides, minute particles of an oxide of the metal are formed by reacting the vapour with oxygen or water vapour. Minute particles of a nitride of the metal and minute particles of a carbide are produced by the similar processes of reacting the vapour with nitrogen or ammonia and a hydrocarbon such a methane, respectively. Since the thus formed minute particles are very small in size, they are excellent in sinterability and are suitable for preparing ceramics of high strength and excellent performance.

As a result of study on gas-phase processes for producing a powdery material of minute composite ceramic particles with two components, the present inventor has found that it is possible to produce a powdery material of minute composite ceramic particles having a dual structure, wherein the component of the core and the component of the outer shell(hull) are different from each other by selecting the respective positions of the inlets for the introduction of the two metal halides into the combustion chamber as a reaction chamber and the shape of the combustion chamber, and has attained to the present invention. According to the present invention, zirconium chloride, especially zirconium tetrachloride is preferably used as the raw material for forming the core and aluminum chloride is used and the raw material for forming the outer shell. It has been confirmed by the present inventor that the ceramic material obtained by sintering the thus produced powdery material of minute composite ceramic particles (powdery material) having a dual structure according to the present invention shows remarkably improved performances as compared to the ceramic material obtained by sintering a mixture of zirconium oxide and aluminum oxide prepared by a conventional simple mixing technique.

SUMMARY OF THE INVENTION

In a first aspect of the present invention, there is provided a powdery material of minute composite ceramic particles having a dual structure, comprising the core formed from zirconium oxide and the outer shell formed from aluminum oxide. The powdery material of the invention is such that the mean diameter of the composite ceramic particles is in the range of 100 to 1200 Å, preferably 400 to 1000 Å.

In a second aspect of the present invention, there is provided a process for producing the powdery material of minute composite ceramic particles having a dual structure, comprising the core formed from zirconium oxide and the outer shell formed from aluminum oxide, said process comprising the steps of:

introducing gaseous zirconium tetrachloride into a combustion chamber provided with a constricting section at the center part thereof and a burner at the upper part thereof, introducing gaseous aluminum chloride into the combustion chamber at the constricting section or the lower part thereof, and thermally decomposing both the thus introduced zirconium tetrachloride and aluminum chloride by a flame from said burner under an oxidative atmosphere.

In a third aspect of the present invention, there is provided an apparatus for producing the powdery material of minute composite ceramic particles having a dual structure, which comprises a heat-resistant combustion chamber as a reaction chamber provided with an outside lining made of a refractory material, a constricting section at the center part thereof, a burner at the part over the constricting section, an inlet at the part over the constricting section for introducing gaseous zirconium tetrachloride forming the core of said powdery material of minute ceramic particles, and an inlet at the constricting section or the section under the constricting section for introducing gaseous aluminum chloride forming the outer shell of the powdery material of minute ceramic particles.

BRIEF EXPLANATION OF THE DRAWINGS

FIG. 3 is an X-ray diffraction pattern of a powdery material of minute ceramic particles having a dual structure according to the present invention and FIG. 4 is an X-ray diffraction pattern of a powdery material of minute ceramic particles used for comparison.

DETAILED DESCRIPTION OF THE INVENTION

The present invention relates to a powdery material of minute composite ceramic particles having a dual structure, comprising the core formed from zirconium oxide and the outer shell formed from aluminum oxide, a process for producing the powdery material of minute composite ceramic particles having a dual structure, which comprises introducing gaseous zirconium tetrachloride into a combustion chamber provided with a constricting section at the center part thereof and a burner at the upper part thereof, introducing gaseous aluminum chloride into the combustion chamber at the constricting section or the lower part thereof, and thermally decomposing both the thus introduced zirconium tetrachloride and aluminum chloride by a flame from said burner under an oxidative atmosphere, and an apparatus for producing the powdery material of minute composite ceramic particles having a dual structure, which comprises a heat-resistant combustion chamber as a reaction chamber provided with an outside lining made of a refractory material, a constricting section at the center part thereof, a burner at the part over the constricting section, an inlet at the part over the constricting section for introducing gaseous zirconium chloride forming the core of said powdery material of minute ceramic particles, and an inlet at the constricting section or the section under the constricting section for introducing gaseous aluminum chloride forming the outer shell of the powdery material of minute ceramic particles.

Figure 1:
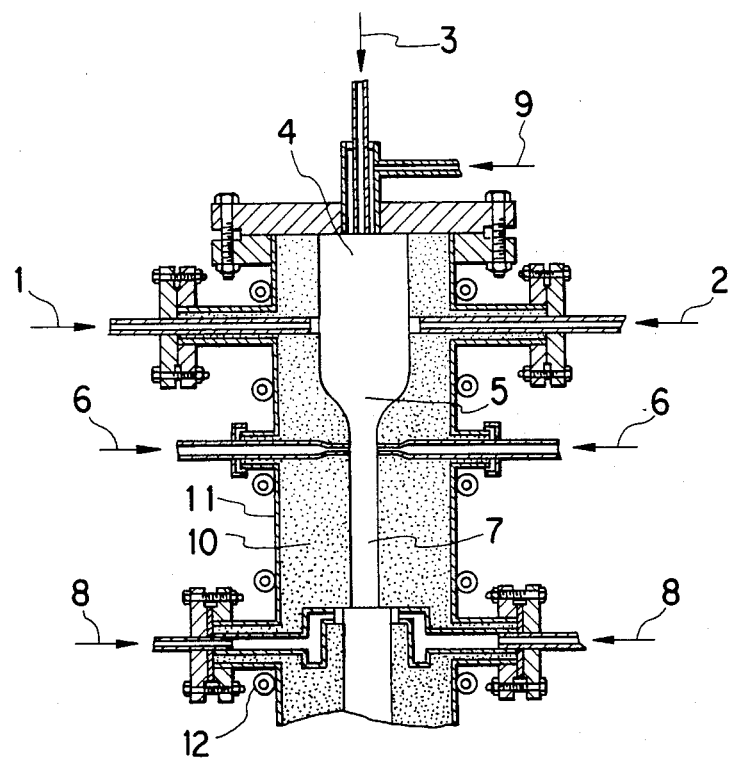
FIG. 1 shows the vertical cross-sectional view of an apparatus as a preferable embodiment of the present invention.

FIG. 1 shows a vertical cross sectional view of the apparatus for producing the powdery material of minute composite ceramic particles having a dual structure according to the present invention. As the heat-source for carrying out the reaction, oxygen and hydrogen are blown into the upper combustion chamber 4, respectively from the inlets 1 and 2 in horizontal directions and eccentrically to the vertical, central axis of the combustion chamber to form a whirled flame. A mixture of vapourized zirconium tetrachloride for forming the core and nitrogen is blown into the upper combustion chamber 4 from the inlet 3 to form minute ceramic particles within the gaseous phase in the upper combustion chamber 4.

The thus formed minute particles and the combustion gas at a high temperature are led to the constricting section 5 which connects the upper combustion chamber 4 with the lower combustion chamber 7 of a smaller diameter than the diameter of the upper combustion chamber. Into the upper part of the lower combustion chamber, a gaseous mixture of vapourized aluminum chloride for forming the outer shell and nitrogen is blown from the inlet 6 to form a shell which covers the already-formed minute ceramic particles of zirconium oxide.

The preparation of the powdery material of minute composite ceramic particles having a dual structure completes in the lower combustion chamber 7, and by introducing a process-recycle gas 8 into the lower part of the lower combustion chamber 7, the reaction product is cooled. The mixture of the thus produced powdery material of minute ceramic particles and the gaseous mixture is led to a dust-collector (not shown in FIG. 1) to separate and collect the powdery material of minute ceramic particles.

In the apparatus for producing the powdery material of minute composite ceramic particles having a dual structure according to the present invention, the nozzle for introducing zirconium tetrachloride into the upper combustion chamber 4 has a dual construction wherein the inner tube is the inlet of the mixture 3 of the vapour of zirconium tetrachloride and nitrogen and the outer tube is the inlet for nitrogen or the recycle gas for preventing the deposition of zirconium oxide on the tip of the inner tube, and the whole apparatus is covered with a refractory lining 10 which is protected from outside by a outer wall 11 made of stainless steel. In addition, as seen in FIG. 1, the outer surface of the wall 11 is heated by steam in the spiral tube 12 for preventing the condensation of water vapour containing hydrogen chloride formed within the system. However, these additional constructions may be changed according to the conditions of production.

In the production of the powdery material of minute composite ceramic particles having a dual structure shown above, the reaction temperature at the upper combustion chamber 4 concerning the decomposition of zirconium tetrachloride is in a range of 1200° to 1900° C. and the reaction temperature at the constricting section 5 and the lower combustion chamber 7 concerning the decomposition of aluminum chloride is in a range of 800° to 1200° C.

In addition, the carrier gas which is introduced into the reaction chamber together with each of the metal chlorides is necessitated for obtaining a predetermined and constant supply of the chloride in an apparatus for evaporating and supplying the vaporized chloride and for preventing the clogging of the tip of the inlet for introducing the chloride into the combustion chamber with the deposited zirconium oxide or aluminum oxide.

As the easily vaporizable compound for use in the case of forming the ceramic minute particles, generally a metal halide, particularly a metal chloride is mainly used. In addition, although an instance of using oxygen and hydrogen has been shown for making a burner flame, a hydrocarbon such as methane may be used as a fuel instead of hydrogen.

The powdery material of minute ceramic particles obtained by the process shown above is a powdery material of minute composite ceramic particles having a dual structure consisting of the core formed of $ZrO_2$ and the outer shell formed of $Al_2O_3$.

According to the examination of the thus produced powdery material of minute ceramic particles by an ordinary X-ray diffraction analysis for powdery specimen, any peaks showing the crystalline phase of $Al_2O_3$ of the shell part were not observed and only the peaks showing the specific crystalline phase of $ZrO_2$ were observed. This suggests that aluminum oxide forming the shell part is amorphous. Concerning the crystalline phase of $ZrO_2$, according to "Bulletin of the Ceramic Society of Japan", Vol. 17, No. 2, pages 106–111, 1982, although $ZrO_2$ may take the three crystalline phases, monoclinic, tetragonal and cubic, the crystalline phase of $ZrO_2$ in a system of $ZrO_2$–$Al_2O_3$ at an ordinary temperature is monoclinic or tetragonal.

In the case where the powdery material of minute composite ceramic particles according to the present invention is subjected to the ordinary X-ray diffraction analysis for powdery specimens and the thus obtained X-ray diffraction pattern (refer to FIG. 3) is examined, three main diffraction peaks A, B and C are observed.

The two peaks C and A are due to monoclinic crystalline phase of $ZrO_2$, and particularly, the peak C is due to (111) plane and the peak A is due to (11$\bar{1}$) plane thereof. The peak B is due to (111) plane of tetragonal crystalline phase of $ZrO_2$.

When the respective intensities of these peaks A, B and C are determined and shown in $Im(11\bar{1})$, $It(111)$ and $Im(111)$, respectively, the following formula represents the volume percentage of the monoclinic crystalline phase in the total crystalline phases of $ZrO_2$ in the specimen, the powdery material of minute composite ceramic particles according to the present invention:

$$\frac{Im(111) + Im(11\bar{1})}{Im(111) + Im(11\bar{1}) + It(111)} \times 100$$

FIG. 4 shows, for comparison, the X-ray diffraction pattern of a powdery material of minute ceramic particles of the same composition, however, prepared by blowing zirconium tetrachloride and aluminum chloride in parallel into the upper combustion chamber.

As seen in Examples, the volume percentage of monoclinic crystalline phase determined by X-ray diffraction analysis of the powdery material of minute composite ceramic particles having a dual structure according to the present invention is less than 50, while the value is much higher in Comparative Examples wherein zirconium tetrachloride and aluminum chloride were blown in parallel into the upper combustion chamber.

The sintered body obtained from the powdery material of minute composite ceramic particles having a dual structure consisting of $ZrO_2$ and $Al_2O_3$ according to the present invention shows an excellent mechanical strength as compared to the shaped body obtained by sintering any conventional powdery material of minute ceramic particles of the same composition, and particularly, the bending strength has been remarkably improved.

In addition, in case where the content of $ZrO_2$ of the powdery material of minute composite ceramic particles having a dual structure according to the present invention is less than 10% by weight or more than 25% by weight, the mechanical strength of the shaped body obtained by sintering a powdery material of minute ceramic particles of $Al_2O_3$ containing $ZrO_2$ is generally insufficient for use. Namely, the mechanical strength of the sintered body obtained from the powdery material of minute composite ceramic particles having a dual structure according to the present invention is very high at the content of $ZrO_2$ in a range of 10 to 25% by weight as compared to those obtained by sintering the powdery material of minute composite ceramic particles having a dual structure, however, containing $ZrO_2$ in an amount outside of the above-mentioned range.

As explained above, the powdery material of minute composite ceramic particles having a dual structure consisting of $ZrO_2$ and $Al_2O_3$ according to the present invention is a novel material based on the specificity of the structure thereof and is highly useful.

In addition, the process and the apparatus for producing such a new material of a dual structure as that explained above can be applied not only to the present invention but also to the cases where any powdery material of minute ceramic particles having a dual structure while using metal halides in general, halides of silicon, phosphorus and boron, respectively, and accordingly, the merit of the present invention contributing to industry is extremely large.

The present invention will be explained more in detail while referring to the non-limitative examples as follows:

EXAMPLE 1

A powdery material of minute composite ceramic particles having a dual structure, composed of the core of $ZrO_2$ and the outer shell of $Al_2O_3$ was produced while using the apparatus shown in FIG. 1 and introducing zirconium tetrachloride into the upper part of the upper combustion chamber 4 and aluminum chloride into the upper part of the lower combustion chamber 7 under the following reaction conditions.

Reaction conditions

Rate of supplying oxygen: 0.2 $Nm^3$/hour
Rate of supplying hydrogen: 0.3 $Nm^3$/hour
Rate of supplying $ZrCl_4$: 47 g (0.2 g-mol)/hour at 300° C.
Rate of supplying nitrogen with $ZrCl_4$: 0.3 $Nm^3$/hour at 300° C.
Rate of supplying nitrogen for protecting the upper inlet 3: 0.1 $Nm^3$/hour
Temperature of the upper combustion chamber: 1700° C.
Rate of supplying $AlCl_3$: 240 g (1.8 g-mol)/hour at 150° C.
Rate of supplying nitrogen with $AlCl_3$: 0.2 $Nm^3$/hour at 150° C.
Temperature of the lower combustion chamber: 920° C.

The powdery material of minute composite ceramic particles having a dual structure obtained under the above-mentioned conditions was composed of 21.1% by weight of $ZrO_2$ and 78.9% by weight of $Al_2O_3$ and comprises the core of zirconium oxide and the outer shell of aluminum oxide.

COMPARATIVE EXAMPLE 1

Figure 2:
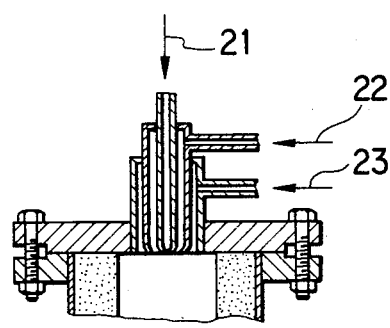
FIG. 2 is a vertical cross-sectional view of the top part of the apparatus for producing a powdery material of minute ceramic particles for comparison.

After reconstructing the upper part of the apparatus shown in FIG. 1 to the structure shown in FIG. 2, zirconium tetrachloride, aluminum chloride and nitrogen were introduced into the combustion chamber from the inlets 21, 22 and 23, respectively under the same conditions as in Example 1 to produce a mixed pulverulent body. The content of $ZrO_2$ of the thus produced mixed powdery material of minute ceramic particles was the same as that of the product of Example 1, i.e., 21.1% by weight.

The results of examining the crystal form of both the products of Example 1 and Comparative Example 1 by X-ray diffraction analysis using a powdery specimen and the results of measuring the diameter of the particles of the products under an electron microscope are shown in Table 1.

TABLE 1

| Specimen obtained in | Example 1 | Comparative Example 1 |
|---|---|---|
| Volume percentage of monoclinic crystals | 33 | 56 |
| Mean diameter of particles (Å) | 520 | 360 |
| Range of diameter of particles (Å) | 100 to 1200 | 100 to 600 |

In addition, the X-ray diffraction patterns of the products of Example 1 and Comparative Example 1 are shown respectively in FIG. 3 and FIG. 4. As clearly seen in the figures, any peaks showing the crystals of $Al_2O_3$ were not observed, the fact suggesting the amorphousness of $Al_2O_3$ of the products, and only the specific peaks of $ZrO_2$ are observed.

Concerning the crystals of $ZrO_2$, the volume percentage of monoclinic crystals differs remarkably between the product of Example 1 and the product of Comparative Example 1.

EXAMPLE 2

While using the apparatus shown in FIG. 1, and changing only the rates of supplying zirconium tetrachloride and anhydrous aluminum chloride to produce two kinds of products having a dual structure of the content of $ZrO_2$ of 11.3 and 29.9% by weight, respectively.

COMPARATIVE EXAMPLE 2

While using the apparatus shown in FIG. 1, however, reconstructed as shown in FIG. 2, two kinds of mixed powdery material of minute ceramic particles containing respectively 11.3 and 29.9% by weight of $ZrO_2$ were produced as in Comparative Example 1.

The results of determining the bending strength of the sintered bodies formed by pressing the above-mentioned powdery material of minute ceramic particles at 1600° C. for one hour are shown in Table 2 together with the data of the sintered bodies prepared of the products of Example 1 and Comparative Example 1, respectively by the same hot-pressing.

TABLE 2

| Structure of pulverulent body | Ex. 1 | Comp. Ex. 1 | Ex. 2 | Comp. Ex. 2 |
|---|---|---|---|---|
| Content of ZrO$_2$ (wt %) | | | | |
| 0 | — | — | — | 37 |
| 11.3 | — | — | 64 | 53 |
| 21.1 | 80 | 59 | — | — |
| 29.9 | — | — | 42 | 32 |

Unit: kg/mm$^2$

As seen in Table 2, the bending strength of the shaped body prepared from the powdery material of minute ceramic particles having a dual structure according to the present invention is higher than that of the shaped body prepared from the pulverulent product by mixing process.

In addition, the values of the volume percentage of monoclinic crystals of the total crystals in the powdery material of minute composite ceramic particles having a dual structure, respectively containing 11.3 and 29.9% by weight of ZrO$_2$ were 27 and 41, respectively. On the other hand, the values of the powdery material of minute ceramic particles prepared by a mixing-reaction in Comparative Examples respectively containing the same amount of ZrO$_2$, i.e., 11.3 and 29.9% by weight, were 54 and 57, respectively.

What is claimed is:

1. A sinterable powdery material of minute composite ceramic particles of a dual structure comprising the core formed of zirconium oxide and the outer shell formed of amorphous aluminum oxide, wherein the content of zirconium oxide is 10 to 25 percent by weight and the volume percentage of monoclinic crystalline phase of said zirconium oxide to the total zirconium oxide crystalline phases is less than 50.

2. A powdery material according to claim 1, wherein the mean diameter of said composite ceramic particles is in the range of from 400 to 1000 Å.

* * * * *